United States Patent
Pelc et al.

(10) Patent No.: US 11,525,958 B1
(45) Date of Patent: Dec. 13, 2022

(54) OFF-CUT WAFER WITH A SUPPORTED OUTCOUPLER

(71) Applicant: Apple Inc., Cupertino, CA (US)

(72) Inventors: Jason Pelc, Sunnyvale, CA (US); Arun Kumar Subramanian, San Jose, CA (US); Patrick B. Wright, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/015,877

(22) Filed: Sep. 9, 2020

Related U.S. Application Data (60) Provisional application No. 62/897,613, filed on Sep. 9, 2019.

(51) Int. Cl.
  *G02B 6/26* (2006.01)
(52) U.S. Cl.
  CPC ...................................... *G02B 6/26* (2013.01)
(58) Field of Classification Search
  CPC .................................. G02B 6/26; G02B 6/4214
  See application file for complete search history.

(56) References Cited

U.S. PATENT DOCUMENTS

| | | | |
|---|---|---|---|
| 5,135,605 A | 8/1992 | Blonder |
| 5,182,787 A | 1/1993 | Blonder |
| 5,287,376 A | 2/1994 | Paoli |
| 5,488,678 A | 1/1996 | Taneya |
| 5,644,667 A | 7/1997 | Tabuchi |
| 5,742,631 A | 4/1998 | Paoli |
| 6,112,005 A | 8/2000 | Liu |
| 6,122,042 A | 9/2000 | Wunderman et al. |
| 6,330,378 B1 | 12/2001 | Forrest |

(Continued)

FOREIGN PATENT DOCUMENTS

| | | |
|---|---|---|
| EP | 1403985 | 3/2004 |
| EP | 1432045 | 6/2004 |

(Continued)

OTHER PUBLICATIONS

Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.

(Continued)

*Primary Examiner* — Tina M Wong
(74) *Attorney, Agent, or Firm* — Brownstein Hyatt Farber Schreck, LLP (57) ABSTRACT

Configurations for a photonics device with a vertical outcoupler and fabrication operations thereof are disclosed. The photonics device may include an off-cut substrate with a cavity. The cavity may be coated with a buffer layer, which may form the vertical outcoupler. The cavity may be filled with a fill material that provides structural integrity to the cavity. The off-cut substrate may have a first and a second cladding layer above and below it, to provide cladding for the waveguide structure. In some examples, light may propagate through the off-cut substrate and may be received by the outcoupler. The outcoupler may reflect and redirect the light out of the waveguide structure and toward one or more optical elements. The optical element(s) may provide the light to a launch region in a system interface and/or to a sample.

14 Claims, 7 Drawing Sheets

(56) References Cited

U.S. PATENT DOCUMENTS

| | | | |
|---|---|---|---|
| 6,393,185 B1 | 5/2002 | Deacon et al. | |
| 6,594,409 B2 | 7/2003 | Dutt et al. | |
| 6,628,686 B1 | 9/2003 | Sargent | |
| 6,657,723 B2 | 12/2003 | Cohen | |
| 6,795,622 B2 | 9/2004 | Forrest | |
| 6,892,449 B1 | 5/2005 | Brophy et al. | |
| 6,940,182 B2 | 9/2005 | Hilton et al. | |
| 6,947,639 B2 | 9/2005 | Singh | |
| 6,952,504 B2 | 10/2005 | Bi | |
| 6,987,906 B2 | 1/2006 | Nakama et al. | |
| 7,054,517 B2 | 5/2006 | Mossberg | |
| 7,058,245 B2 | 6/2006 | Farahi | |
| 7,079,715 B2 | 7/2006 | Kish | |
| 7,203,401 B2 | 4/2007 | Mossberg | |
| 7,203,426 B2 | 4/2007 | Wu et al. | |
| 7,209,611 B2 | 4/2007 | Joyner | |
| 7,245,379 B2 | 7/2007 | Schwabe | |
| 7,250,317 B2 | 7/2007 | Heideman | |
| 7,283,694 B2 | 10/2007 | Welch | |
| 7,314,451 B2 | 1/2008 | Halperin et al. | |
| 7,324,195 B2 | 1/2008 | Packirisamy et al. | |
| 7,366,364 B2 | 4/2008 | Singh | |
| 7,447,393 B2 | 11/2008 | Yan | |
| 7,460,742 B2 | 12/2008 | Joyner | |
| 7,477,384 B2 | 1/2009 | Schwabe | |
| 7,483,599 B2 | 1/2009 | Dominic et al. | |
| 7,526,007 B2 | 4/2009 | Chua et al. | |
| 7,558,301 B2 | 7/2009 | Lin et al. | |
| 7,680,364 B2 | 3/2010 | Nilsson | |
| 7,720,328 B2 | 5/2010 | Yan | |
| 7,885,302 B2 | 2/2011 | Eberhard | |
| 7,885,492 B2 | 2/2011 | Welch | |
| 7,974,504 B2 | 7/2011 | Nagarajan | |
| 7,995,875 B2 | 8/2011 | Yasuda et al. | |
| 8,041,159 B2 * | 10/2011 | Yanagisawa | G02B 6/4214 385/14 |
| 8,236,481 B2 | 8/2012 | Nottola et al. | |
| 8,300,994 B2 | 10/2012 | Welch et al. | |
| 8,559,775 B2 | 10/2013 | Babie et al. | |
| 8,564,784 B2 | 10/2013 | Wang et al. | |
| 8,724,100 B1 | 5/2014 | Asghari et al. | |
| 8,774,575 B2 | 7/2014 | Fujiwara et al. | |
| 8,920,332 B2 | 12/2014 | Hong et al. | |
| 8,983,250 B2 | 3/2015 | Black et al. | |
| 9,020,004 B2 | 4/2015 | Jeong | |
| 9,025,926 B2 | 5/2015 | Chang | |
| 9,031,412 B2 | 5/2015 | Nagarajan | |
| 9,110,259 B1 | 8/2015 | Black | |
| 9,135,397 B2 | 9/2015 | Denyer et al. | |
| 9,176,282 B2 | 11/2015 | Pottier | |
| 9,182,544 B2 | 11/2015 | Kobrinsky | |
| 9,217,669 B2 | 12/2015 | Wu et al. | |
| 9,229,179 B2 | 1/2016 | Ishibashi | |
| 9,285,555 B2 | 3/2016 | Yabre | |
| 9,348,154 B2 | 5/2016 | Hayakawa | |
| 9,370,689 B2 | 6/2016 | Guillama et al. | |
| 9,377,594 B2 | 6/2016 | Lift | |
| 9,405,066 B2 | 8/2016 | Mahgerefteh | |
| 9,470,864 B1 | 10/2016 | Yo | |
| 9,507,086 B2 | 11/2016 | Kobrinsky | |
| 9,543,736 B1 | 1/2017 | Barwicz et al. | |
| 9,568,679 B2 | 2/2017 | Doany et al. | |
| 9,620,931 B2 | 4/2017 | Tanaka | |
| 9,664,858 B2 | 5/2017 | Mohammed | |
| 9,696,486 B2 | 7/2017 | Zheng | |
| 9,705,289 B2 | 7/2017 | Kanskar et al. | |
| 9,766,370 B2 | 9/2017 | Aloe et al. | |
| 9,804,027 B2 | 10/2017 | Fish et al. | |
| 9,829,631 B2 | 11/2017 | Lambert | |
| 9,880,352 B2 | 1/2018 | Florjanczyk | |
| 9,943,237 B2 | 4/2018 | Baker et al. | |
| 9,948,063 B2 | 4/2018 | Caneau et al. | |
| 10,009,668 B2 | 6/2018 | Liboiron-Ladouceur | |
| 10,018,781 B1 | 7/2018 | Masuda | |
| 10,025,044 B1 | 7/2018 | Masuda | |
| 10,054,737 B2 | 8/2018 | Kobrinsky | |
| 10,132,996 B2 | 11/2018 | Lambert | |
| 10,209,452 B1 | 2/2019 | Hung et al. | |
| 10,238,351 B2 | 3/2019 | Halperin et al. | |
| 10,261,256 B2 | 4/2019 | Beausoleil et al. | |
| 10,285,898 B2 | 5/2019 | Douglas et al. | |
| 10,310,196 B2 | 6/2019 | Hutchison | |
| 10,379,293 B2 | 8/2019 | Nakazuru et al. | |
| 10,429,597 B2 | 10/2019 | Ten Have et al. | |
| 10,529,003 B2 | 1/2020 | Mazed | |
| 10,539,752 B2 | 1/2020 | Masuda | |
| 10,558,003 B2 | 2/2020 | Ootorii | |
| 10,613,282 B2 | 4/2020 | Cyr | |
| 10,634,843 B2 | 4/2020 | Bayn et al. | |
| 10,650,110 B2 | 5/2020 | Van Vaerenbergh et al. | |
| 10,687,718 B2 | 6/2020 | Allee et al. | |
| 10,725,242 B2 | 7/2020 | Beausoleil et al. | |
| 10,823,912 B1 | 11/2020 | Pelc et al. | |
| 10,852,492 B1 | 12/2020 | Vermeulen et al. | |
| 2005/0053112 A1 | 3/2005 | Shams-Zadeh-Amiri | |
| 2005/0063431 A1 | 3/2005 | Gallup et al. | |
| 2006/0002443 A1 | 1/2006 | Farber et al. | |
| 2008/0044128 A1 | 2/2008 | Kish et al. | |
| 2008/0310470 A1 | 12/2008 | Ooi et al. | |
| 2009/0046978 A1 * | 2/2009 | Yasuda | G02B 6/1221 385/31 |
| 2011/0243499 A1 * | 10/2011 | Fujiwara | G02B 6/1221 385/131 |
| 2014/0029943 A1 | 1/2014 | Mathai et al. | |
| 2014/0086527 A1 | 3/2014 | Ban et al. | |
| 2015/0362673 A1 * | 12/2015 | Zheng | G02B 6/136 385/14 |
| 2016/0224750 A1 | 8/2016 | Kethman et al. | |
| 2017/0164878 A1 | 6/2017 | Connor | |
| 2019/0025527 A1 * | 1/2019 | Ootorii | G02B 6/4214 |
| 2019/0339468 A1 | 11/2019 | Evans | |
| 2019/0342009 A1 | 11/2019 | Evans | |
| 2020/0084050 A1 | 3/2020 | Mensch et al. | |
| 2020/0152615 A1 | 5/2020 | Krasulick et al. | |
| 2020/0244045 A1 | 7/2020 | Bismuto et al. | |
| 2020/0253547 A1 | 8/2020 | Harris et al. | |
| 2020/0309593 A1 | 10/2020 | Bismuto et al. | |
| 2021/0033805 A1 | 2/2021 | Bishop et al. | |
| 2021/0263216 A1 | 8/2021 | Bishop et al. | |
| 2022/0128782 A1 | 4/2022 | Goldis | |

FOREIGN PATENT DOCUMENTS

| | | |
|---|---|---|
| JP | 2008089879 | 4/2008 |
| JP | 2008262118 | 10/2008 |
| WO | WO 01/014929 | 3/2001 |
| WO | WO 04/031824 | 4/2004 |
| WO | WO 05/091036 | 9/2005 |
| WO | WO 11/090274 | 7/2011 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 20/106974 | 5/2020 |

OTHER PUBLICATIONS

Kybartas et al., "Capacitive Sensor for Respiratory Monitoring," Conference "Biomedical Engineering," Nov. 2015, 6 pages.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Worhoff et al., "Flip-chip assembly for photonic circuits," MESA+ Research Institute, University of Twente, Integrated Optical MicroSystems Group, The Netherlands, 12 pages.

U.S. Appl. No. 16/650,804, filed Mar. 25, 2020, Arbore et al.

U.S. Appl. No. 17/254,810, filed Dec. 21, 2020, Bishop et al.

(56) References Cited

OTHER PUBLICATIONS

He et al., "Integrated Polarization Compensator for WDM Waveguide Demultiplexers," *IEEE Photonics Technology Letters* vol. 11, No. 2, Feb. 1999, pp. 224-226.

Sauer et al., "Individualized FAC on Bottom Tab subassemblies to minimize adhesive gap between emitter and optics," *High-Power Diode Laser Technology XV*, edited by Mark S. Zediker, Proceeding of SPIE, vol. 10086, 2017, 8 pages.

\* cited by examiner

OFF-CUT WAFER WITH A SUPPORTED OUTCOUPLER

CROSS-REFERENCE TO RELATED APPLICATION

This application is a nonprovisional of and claims the benefit under 35 U.S.C. § 119(e) of U.S. Provisional Patent Application No. 62/897,613, filed Sep. 9, 2019, and entitled "Vertical Output Coupler Off-Cut Wafer," the contents of which are incorporated herein by reference as if fully disclosed herein.

FIELD

This disclosure generally relates to a photonics device with an outcoupler. More particularly, this disclosure relates to a photonics device with an off-cut substrate and a supported outcoupler.

BACKGROUND

Generally, optical sensing systems can include a photonics device. In some examples, a photonics device may include a light source, where the fabrication and integration of the light source can affect the performance of the photonics device. In some examples, fabricating the photonics device may present a number of challenges and may also affect its cost, yield, and manufacturing time. In some examples, the fabrication processes may cause undercut the layers of the photonics device, thus making the photonics device less reliable, having lower yields, and more susceptible to being damaged during fabrication or in the field.

SUMMARY

Embodiments of the systems, devices, methods, and apparatuses described in the present disclosure are directed to a photonics device with an outcoupler. Also described are systems, devices, methods, and apparatuses directed to providing a photonics device that includes an outcoupler with fill material that may increase the structural integrity of the outcoupler and the photonics device to provide a supported outcoupler. The outcoupler sidewalls or sides may have angles that are based on the crystal orientation of an off-cut substrate. The terms "sides" and "sidewalls" may be used interchangeably herein.

In some examples, the present disclosure describes a photonics device. The photonics device may include a first substrate, a second, off-cut substrate located below the first substrate and defining a cavity, a buffer material coating the second, off-cut substrate and the cavity, a fill material located inside the cavity, and a cladding layer between the first substrate and the second off-cut substrate and adjacent to the fill material and the buffer material. In some examples, the buffer material may be configured to receive light and may redirect light toward a surface of the photonics device. In some examples, the second, off-cut substrate may include a planar surface, a first sidewall extending from the planar surface at a first angle, a second sidewall extending from the planar surface at a second angle, and a base connected to the first and second sidewalls. In some examples, the first angle of the first sidewall may be oriented at a <111> crystal orientation and the second angle of the second sidewall may be oriented at a <111> crystal orientation. In some examples, the buffer material may be part of an outcoupler, the fill material and the buffer material may form a plane, and the fill material may provide structural integrity to the cavity. In some examples, the second, off-cut substrate may include a planar surface, a first sidewall extending from the planar surface at a first angle, a second sidewall extending from the planar surface at a second angle, and a base connected to the first and second sidewalls. In some examples, the first angle of the first sidewall may be oriented at a <111> crystal orientation and the second angle of the second sidewall may be oriented at a <111> crystal orientation.

In some examples of the photonics device, the buffer material may be an outcoupler and the photonics device may include an anti-reflection layer that is adjacent to the second off-cut substrate and above the outcoupler. In some examples, the first substrate may be silicon and the second off-cut substrate may be an off-cut silicon-on-insulator substrate. In some examples, the second off-cut substrate may be offset from a <100> crystal orientation by 9.7 degrees. In some examples, the buffer material may be a continuous layer having a first portion abutting between the first substrate and the second off-cut substrate and adjacent to the fill material and the buffer material, a second portion operative to reflect light, and a third portion abutting a second cladding layer and an anti-reflective coating. In some examples, the buffer material may be silicon dioxide. Additionally, in some examples, the second, off-cut substrate may include a planar surface, a first sidewall extending from the planar surface at a first angle, a second sidewall extending from the planar surface at a second angle, and the first and the second angle may be the same. In some examples, the fill material may be poly-silicon.

In some examples, the present disclosure describes a method of forming an inverted photonics device. The method of forming an inverted photonics device may include bonding a first substrate to a sacrificial substrate, etching a cavity into the first substrate, depositing a buffer layer adjacent to the first substrate and the cavity, depositing a fill layer into the cavity adjacent the buffer layer, depositing a cladding layer adjacent to the fill layer and the buffer layer, bonding the cladding layer to a third substrate by inverting the first substrate, and removing the sacrificial substrate. In some examples, the buffer layer may form an outcoupler. In some examples depositing the fill layer may include depositing a poly-silicon layer. In some examples, the method may include selectively etching the cavity along a <111> crystal plane, etching the fill layer until a surface of the fill layer is co-planar with the buffer layer, etching an area of the cladding layer above the outcoupler, and depositing an anti-reflection layer in the etched area of the cladding layer. In some examples, etching the fill layer may include chemically and mechanically polishing the fill layer in order to remove a portion of the fill layer and the buffer layer may function as a stop layer for etching the fill layer. In some examples, the first substrate may have a 9.7 degree offset from a <100> crystal orientation. In some examples, the sacrificial substrate may be a silicon-on-oxide wafer and removing the sacrificial substrate may include using chemical mechanical polishing. In still further examples, the cladding layer may be silicon dioxide and the method may include etching the cladding layer using chemical mechanical polishing to a predetermined thickness.

In some examples, the present disclosure describes a waveguide structure. The waveguide structure may include a first cladding layer configured to reflect light, a buffer layer adjacent to the first cladding layer and configured to reflect light out of the waveguide structure, a reinforcement material disposed under the buffer layer, where the reinforcement material is configured to provide structural reinforcement to the buffer layer, an offset silicon layer configured to allow light to propagate through the offset silicon layer, and a second cladding layer adjacent to the offset silicon layer and configured to reflect light. In some examples, the buffer layer may be an outcoupler or part of an outcoupler. In some examples, the waveguide structure may also include an anti-reflective layer positioned above the outcoupler, where the outcoupler may include a first side extending at a first angle from the offset silicon layer a second side opposite the first side and extending at a second angle from the offset silicon layer, the first angle and the second angle may be determined by the crystal orientation of the offset silicon layer, and the offset silicon layer may be a core of the waveguide structure. In some examples, the buffer layer may be silicon dioxide. In some examples, the reinforcement material may be poly-silicon and a surface of the poly-silicon may be co-planar with the buffer layer. In still further examples, the offset silicon layer may be offset 9.7 degrees from a <100> crystalline plane.

Described herein is an outcoupler in a waveguide structure that may be formed using a sacrificial wafer that serves as a handle when bonding the waveguide structure to a substrate wafer. The outcoupler may be formed with an etched cavity that may be coated with a buffer material and then filled in its entirety with a fill material or reinforcement material by deposition or other appropriate methods of depositing material. The waveguide structure may be inverted and bonded to another material. The outcoupler may be supported or reinforced to prevent collapse, movement, or degradation of the material layers including the reflective buffer material layer.

With the described outcoupler and associated fabrication process, the outcoupler may be supported by the fill material or reinforcement material. By providing the fill material, the fabrication complexity may be reduced, and problems associated with integration of the outcoupler into an integrated photonics device may be reduced.

In addition to the example aspects and embodiments described above, further aspects and embodiments will become apparent by reference to the drawings and by study of the following description.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

These and other embodiments are discussed below with reference to FIGS. 1-4. However, those skilled in the art will readily appreciate that the detailed description given herein with respect to these Figures is for explanatory purposes only and should not be construed as limiting.

Directional terminology, such as "top", "bottom", "upper", "lower", "above", "below", "beneath", "front", "back", "over", "under", "left", "right", and so forth, is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways.

As used herein, the term "abutting" means that two elements share a common boundary or otherwise contact one another, while the term "adjacent" means that two elements are near one another and may (or may not) contact one another. Thus, elements that are abutting are also adjacent, although the reverse is not necessarily true. Two elements that are "coupled to" one another may be permanently or removably physically coupled to one another and/or operationally or functionally coupled to one another.

In the following description of examples, reference is made to the accompanying drawings in which it is shown by way of illustration specific examples that can be practiced. It is to be understood that other examples can be used and structural changes can be made without departing from the scope of the various examples.

Generally, photonics devices may be used for sensing and processing light in electronic systems and devices. Some photonics devices may be used for transmitting light and may be included in an electronic device, such as mobile devices, tablets, smart phones, and so forth, which may be used for various purposes such as optical communication, environmental sensing, and/or biometric sensing. Mobile electronic devices are growing in popularity and these devices are often small enough to be portable and/or handheld. The architectures of these mobile devices may include various components, including photonics circuitry, which may affect the size of the device into which it is incorporated.

Because of the increasing emphasis on smaller, more compact optical and electronic devices, the size and thickness of the optical and electrical components inside of the electronic device may be limited. In some examples, a particular size of the electronic device is targeted and each component, such as the photonics device within the electronic device, is given a maximum form factor or area that the component may occupy within the electronic device. Accordingly, the fabrication and physical configuration of the photonics device may become increasingly important to the form factor of the device.

In some examples, a photonics device may receive light from a light source and the light may be optically coupled out of the photonics device. In some examples, the photonics device may receive light generated from one or more light sources (e.g., a laser, LED, coherent light source, semi-coherence light source, any combination thereof, and so forth), and the light sources may be connected to or otherwise integrated into the photonics device. After the light is received from the light sources and before the light is optically coupled out of the photonics device, the light may propagate along a waveguide structure that is part of the photonics device, and may include a top and bottom cladding and a core (e.g. propagation layer). In some examples, the light sources may be lasers, light emitting diodes, semiconductor lasers, coherent light sources, semi-coherent light sources, any combination thereof, and so forth. In some examples, the light sources may be optically coupled to or integrated into the photonics device. The photonics device is a device with photonics and/or optical functionality and components. As used herein, a photonics device may include the waveguide structure and the outcoupler. The waveguide structure may include a first cladding layer, the core, and a second cladding layer, and the outcoupler. As light propagates through the core, the light may reflect off of the outcoupler to exit the waveguide structure.

The photonics device may include an optical element, such as a vertical outcoupler, which may be used to couple light out of the waveguide structure. In some examples, the vertical outcoupler(s) can be formed of the same material as the waveguide cladding, which can help reduce the amount of lost light. It may be understood that the outcoupler may be part of the waveguide structure insofar as the light propagates in the core of the waveguide structure and the outcoupler may be a reflective material at an end of the waveguide structure. In some examples, the outcoupler(s) may be formed by etching different material layers. Different etch steps can be used to selectively remove material. For example, multiple etch steps can be used to vertically and/or selectively etch material. When material is selectively etched in a specific area, different materials may etch at different rates, which may result in a cavity with angled sides, such as an outcoupler.

Although the outcoupler resulting from the multiple etch steps may be able to meet optical performance requirements, challenges may arise when the outcoupler is integrated with other components of the photonics device. As discussed, the multiple etch steps to create the angled facet may form a cavity or unsuitably large opening. This opening may expose the angled sides or outcoupler to a post fabrication processing step, which may detrimentally affect the outcoupler. Different solutions, such as depositing materials to fill the cavity from the top, may lead to extra processing steps, costs, time, and so forth. In some examples, the cavity may include an overhanging sidewall and this overhanging sidewall may be vulnerable to process-related problems, breakage, contamination, and so forth.

As described herein, the photonics device may include a vertical outcoupler for redirecting light toward the surface to exit the photonics device. The photonics device may receive light from one or more light sources and the light may propagate through one or more corresponding waveguide structures to one or more vertical outcouplers. The vertical outcoupler(s) can vertically redirect the light to one or more optical elements, which can collimate, focus, and/or direct the light to a launch region of the photonics device and to a sample.

The photonics device may include an outcoupler, which may be formed using a sacrificial substrate and an off-cut substrate. As used herein, the term "off-cut substrate" refers to a substrate having a surface extending at an angle other than an on-axis angle of the substrate. For example, the off-cute substrate may be produced by cutting an on-axis crystal substrate at a selected angle that is between zero and 90 degrees, insofar as the selected angle is greater than zero degrees, but less than 90 degrees. A cavity may be formed in the off-cut substrate and a buffer material may coat both the off-cut substrate and the cavity, where the thickness of the buffer material may be based on the wavelength(s) of light emitted from the photonics device. The buffer layer may additionally function as the outcoupler, which may reflect light and direct light to exit from a surface of the photonics device or may reflect light and redirect the light toward the surface of the photonics device. In some examples, a fill material may be deposited in the cavity to provide structural integrity to the cavity, resulting in a supported outcoupler which will be described in further detail with respect to FIGS. 1-4. Additionally, a cladding layer may be formed or placed between the sacrificial substrate and the off-cut substrate and adjacent to the fill material and the buffer material. In some examples, the cladding layer may be bonded to a third substrate and the sacrificial substrate may be removed. This fabrication process may address the issues associated with previous fabrication techniques and integration of the outcoupler into a device.

Photonics Device Overview

Figure 1:
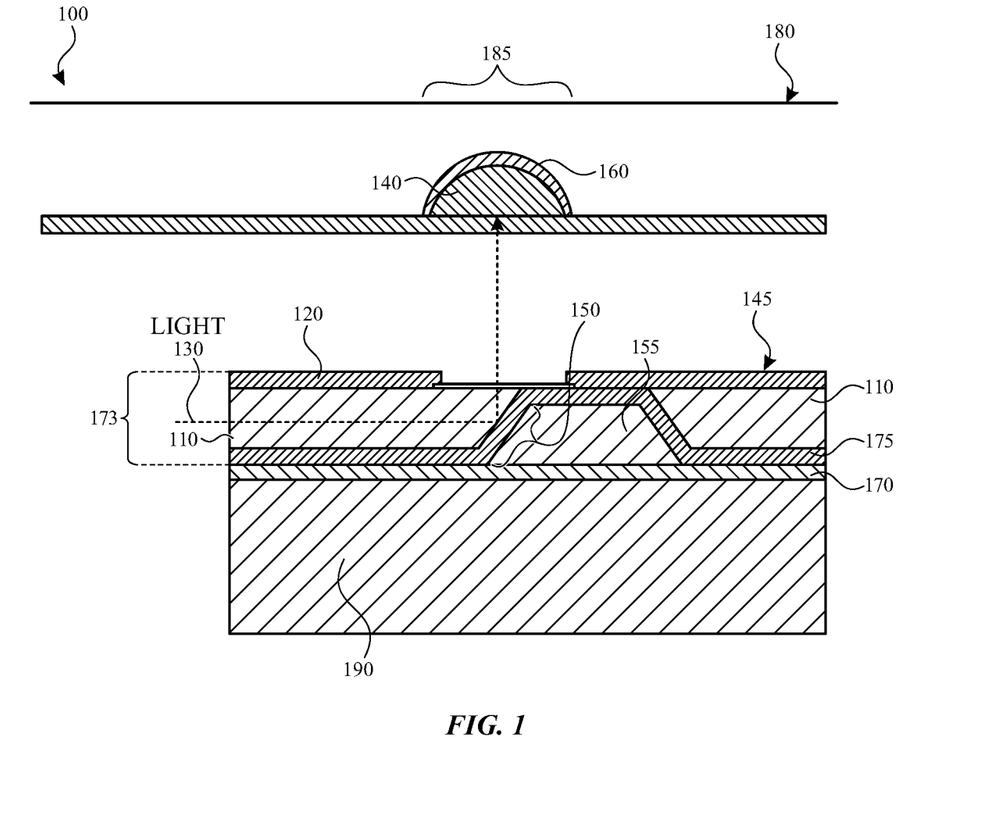
FIG. 1 illustrates an example of a photonics device.

FIG. 1 illustrates an example of a photonics device. The photonics device 100 may include a waveguide structure that may include first cladding layer 170 and second cladding layer 120. The first cladding layer 170 may be adjacent to a substrate 190 that is positioned below the first cladding layer 170 and the first cladding layer 170 may be adjacent to a buffer material 175 and fill material 155. In some examples, the substrate 190 may serve as a support substrate to the waveguide structure 173. In some examples, the first cladding layer 170 may abut the buffer material 175. Light 130 may propagate through the off-cut substrate 110 and be received by the buffer material 175 and the outcoupler 150, where the reflective surface of the outcoupler 150 may be the buffer material 175. The buffer material 175 and the outcoupler 150 may reflect the light out of the waveguide structure 173 and/or toward the surface of the waveguide structure 173 so that the light may exit the waveguide structure 173. The light may pass through a coating 167, which may be an anti-reflective coating. The light may then be received by an optical element 140 with an anti-reflective coating 160 and may continue to propagate up through a launch region 185 of a system interface 180. The terms "offset" and "off-cut" may be used interchangeably herein.

In some examples, the off-cut substrate 110 may function as a core of a waveguide structure 173 and light may propagate through the off-cut substrate 110 as depicted in FIG. 1. In some examples, the off-cut substrate 110 may be a silicon-on-insulator substrate, which may be approximately three microns thick. The off-cut substrate 110 may be approximately 9.7 degrees offset or off-cut from a <100> crystalline structure. The cavity 155 etched into the off-cut substrate 110 may be filled with a fill material such as poly-silicon. In other examples, the fill material may be an oxide material, which may include other process changes which will be discussed in further detail below with respect to FIGS. 2A-2I. In some examples, the fill material may reinforce the cavity walls and reduce the likelihood that the walls of the cavity may shift, move, and/or collapse. Although the cavity 155 may be filled with a fill material, for discussion purposes, the cavity 155 may be referred to as such, with or without the fill material inside of it.

In some examples, the light 130 may be substantially confined in the off-cut substrate 110 by the first cladding layer 170 and the second cladding layer 120. The first cladding layer 170 and the second cladding layer 120 may receive light 130 that is propagating in the off-cut substrate 110 and the first and second cladding layers may reflect the light 130 back into the off-cut substrate 110 so that the light 130 may continue to propagate through the off-cut substrate. The first cladding layer 170 and the second cladding layer 120 may be silicon dioxide, or any other oxide, or appropriate material that may be used as cladding such as nitride. The second cladding layer 120 may include an anti-reflective layer 135 that may be positioned approximately above the outcoupler 150 and the second cladding layer 120 may be removed in the area of the anti-reflective layer 135. The anti-reflective layer 135 may allow light that is redirected by the outcoupler 150 to pass through and toward the optical element 140.

In some examples, the off-cut substrate may be referred to as an offset silicon layer. In some examples, the outcoupler 150 may include a first side extending at a first angle from the offset silicon layer, a second side opposite the first side and extending at a second angle from the offset silicon layer, where the first angle and the second angle are determined by the crystal orientation of the offset silicon layer. In some examples, the offset silicon layer may be the core of the waveguide structure 173.

In some examples, the buffer material 175 may be silicon dioxide, which may coat the outcoupler 150 from which the light 130 may reflect and be redirected to the optical element 140. That is, the buffer material 175 may receive, reflect, and redirect the light 130 toward the optical element 140. The thickness of the buffer material 175 may depend on the wavelength of light. When the thickness of the buffer material 175 is some multiple of a half-wavelength of the wavelength of light 130, the reflected waves may reinforce each other, thus increasing the reflectance of the material; accordingly, the buffer material 175 thickness depends on the wavelength of light.

The angle of the outcoupler 150 may be based at least partially on the crystal orientation of the off-cut substrate 110 and the selective, anisotropic etch that forms the cavity 155. In some examples, the sidewalls of the cavity 155 that form the outcoupler 150 may be at an angle approximately 45 degrees with respect to the planar surface of the off-cut substrate 110. The angle of the cavity 155 sidewalls may allow the light 130 to be redirected toward the optical element 140. Although the angle of the cavity 155 sidewalls or the outcoupler 150 may described as approximately 45 degrees with respect to the planar surface of the off-cut substrate 110, the outcoupler 150 may be any appropriate angle, such as 30°, 45°, 54.7°, 60°, so long as the angle is non-perpendicular and non-parallel to the planar surface of the off-cut substrate 100. The outcoupler 150 may function as a total internal reflection interface for light in the off-cut substrate 110 and the second cladding layer 120. Although the light 130 may be discussed as being received by or reflecting off of the outcoupler 150, it may be understood that the light 130 may be received by or may be reflecting off of the buffer material 175 that is a coating on the outcoupler 150. In some examples, the buffer material 175 is to be considered part of the outcoupler 150.

Once the light 130 is redirected by the outcoupler 150, the second cladding layer 120 can allow light 130 to transmit towards the optical element 140. The optical element 140 may be coated with an anti-reflective coating 160. The anti-reflective coating 160 may reduce optical loss that may otherwise occur as the light 130 passes through the optical element 140. For example, the anti-reflective coating 160 can reduce the amount of light that reflects back to the interface 145 of the off-cut substrate 110 and the second cladding layer 120. In some examples, the second cladding layer 120 can be deposited on and directly adjacent to the off-cut substrate 110 as will be discussed in further detail with reference to FIGS. 2A-2I. In some examples, the second cladding layer 120 may abut the off-cut substrate 110. In some examples, the optical element 140 may redirect, collimate, and/or focus light towards the system interface 180.

In some examples, the off-cut substrate 110 can also be used, at least in part, to form one or more layers of the waveguide structure 173 through which the light 130 may propagate. Although the off-cut substrate is depicted as a single layer, the off-cut substrate may be representative of multiple layers as appropriate. In some examples, the waveguide structure 173 may include at least the off-cut substrate 110, the first cladding layer 170, and the second cladding layer 120, where the first and second cladding layers 170 and 120, respectively, may substantially confine the light 130. In some examples, the off-cut substrate 110 can include an insulating layer, such as silicon nitride, for insulating and/or encapsulating metal routing layers.

In some examples, the second cladding layer 120 can include one or more conductive layers for routing one or more signals to one or more optical components. For example, the second cladding layer 120 may route one or more signals from a controller (not illustrated in FIG. 1) to control a light source, which can emit light in response to the one or more signals. The second cladding layer 120 can also include one or more insulating layers. In some examples, the second cladding layer 120 may isolate multiple conductive layers electrically isolated by the cladding layer(s). In some instances, the second cladding layer 120 can include one or more encapsulation layers, passivation layers, planarizing layers, any combination thereof, and so forth.

In further examples, the photonics device 100 may include additional layers, not shown in FIG. 1, located above and/or below the cladding layers of the waveguide structure. Further, although FIG. 1 illustrates the off-cut substrate 110, the first cladding layer 170, the second cladding layer 120, the buffer material 175, and so forth, as single layers, it may be understood that different embodiments may include one or more of these layers being representative of multiple layers. Additionally, the photonics device 100 may include fewer or more optical elements, routing elements, electrical elements, isolating layers, any combination thereof, and so forth that are not illustrated in FIG. 1.

Photonics Device Fabrication

Figure 2A:
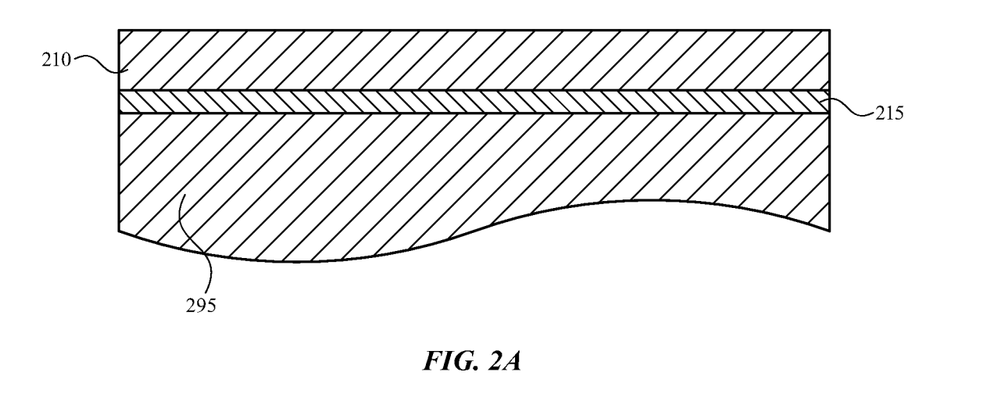
FIG. 2A illustrates a side view of a photonics device during processing.

FIGS. 2A-2I illustrate a side view of a photonics device during processing. In FIG. 2A, an off-cut substrate 210 may be mounted on a sacrificial substrate 295. As depicted in FIG. 2A, a layer 215 may be between the off-cut substrate 210 and the sacrificial substrate 295. The layer 215 may be an oxide or nitride layer or any appropriate layer that may act as an etch stop of the cavity 255, and/or may aid in grinding, polishing, and or etching the sacrificial layer off of the off-cut substrate 210 as will be described herein. In some examples, the off-cut substrate 210 may be approximately three microns thickness, which may be the target thickness of the waveguide structure of the photonics device.

In some examples, the off-cut substrate 210 may be an off-cut silicon-on-insulator (SOI) wafer. The orientation of the off-cut substrate 210 can affect the resulting angle of the outcoupler or sidewalls of the cavity as shown in FIG. 1 and as described herein. A selective wet etch, which may be an anisotropic etch of the off-cut substrate 210, can cause a preferential termination of etching on a plane, where the plane can be related to the crystal orientation of the off-cut substrate 210. In some examples, the sacrificial substrate 295 may be a silicon wafer with a <100> crystal orientation though, due to the removal of the sacrificial substrate 295 in subsequent processing steps, the crystal orientation and type of sacrificial substrate 295 may not affect the processing of the off-cut substrate 210. In some examples, the off-cut substrate 210 may be offset approximately 9.7 degrees from a <100> crystal orientation. The off-cut substrate may be offset from the <100> crystal orientation depending on which crystal orientation or plane along which the cavity is etched. For example, if the sidewalls of the cavity were selectively etched along a <010> crystal plane instead of the <111> crystal plane, the offset of the off-cut substrate relative to the <100> crystal orientation would be different. The terms "offset" and "off-cut" may be used interchangeably herein.

Figure 2B:
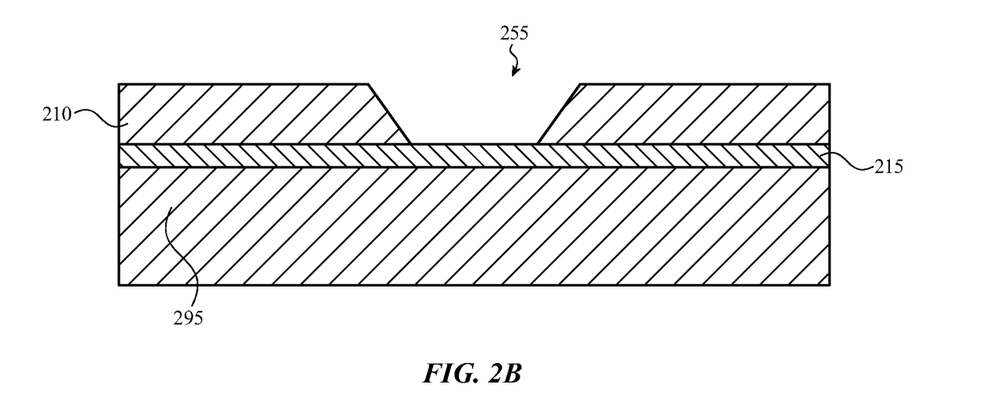
FIG. 2B illustrates a side view of a photonics device during processing.

In FIG. 2B, the off-cut substrate 210 may be selectively etched to form a cavity 255. The etch may be an anisotropic etch in that the material may etch at different rates in different directions. In some examples, the cavity 255 may be anisotropically etched with high selectivity to the <111> crystal plane or crystal orientation and the top of the cavity may be the widest part of the cavity and the bottom of the cavity may be the narrowest part of the cavity. As used herein, the terms "crystal plane" and "crystal orientation" may be used interchangeably. The etch may be a wet or dry etch as appropriate. In some examples, a wet etch may be employed, such as KOH or TMAH etching, though other organic hydroxide etches may be used. The cavity may be etched with sidewalls that are approximately 45 degrees with reference to the sacrificial substrate 295. The cavity sidewalls may have a <111> crystal orientation. In some examples, the layer 215 may function as an etch stop and may be silicon dioxide or silicon nitride (SiNx). In some examples, the angled sidewall of the cavity 255 can be an angled facet for an outcoupler or mirror as discussed with respect to FIG. 1 and herein.

Previous techniques of forming a cavity typically involved etching from the top surface down and undercutting each lower layer more than the layer above it, so that the widest part of the cavity was toward the bottom of the cavity and the narrowest part of the cavity was toward the top of the cavity. Generally, cavities etched in this manner were larger at the bottom and narrower toward the top. In this way, a cavity with angled sidewalls was formed, but due to the general shape of the cavity, it was difficult to deposit any type of fill material into the cavity because the top of the cavity was narrower than the bottom so material could not be deposited into the cavity to support the overhanging sidewalls. Alternatively and as described herein with reference to FIGS. 1-4, the cavity etched in FIG. 2B is larger at the top of the cavity than at the bottom, and material may be deposited in the cavity so that once the structure is inverted, the sidewalls of the cavity may be structurally supported in that the fill material may provide structural integrity to the sidewalls.

Figure 2C:
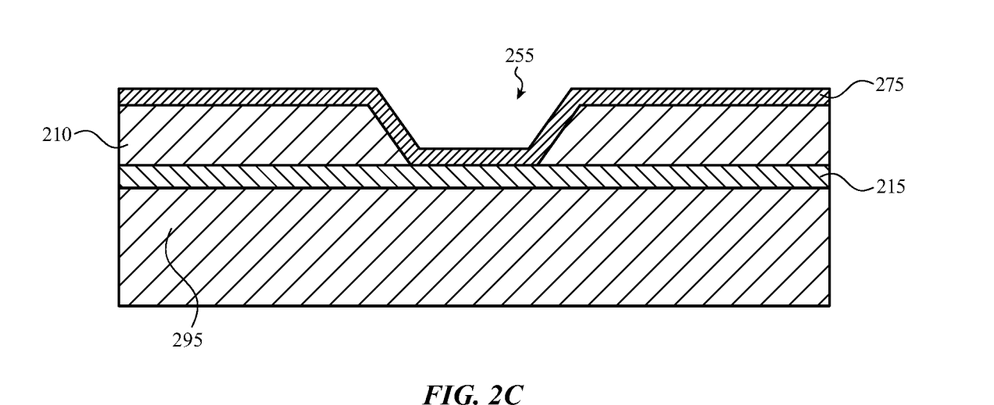
FIG. 2C illustrates a side view of a photonics device during processing.

In FIG. 2C, a buffer layer 275 may be deposited, which may be greater than three microns thick. In some examples, the buffer layer 275 may be silicon dioxide or any other appropriate material such as an oxide material. The buffer layer 275 may coat the off-cut substrate 210, the cavity 255, including the cavity sidewalls, and may also coat the bottom of the cavity 255 which may be the layer 215. The buffer layer 275 may be deposited in a conformal layer with an approximately consistent thickness over the varying surfaces. In some examples, the buffer layer 275, in conjunction with the sidewall of the cavity 255, may provide the functionality of the outcoupler 150 as described with reference to FIG. 1. As shown in FIG. 1, the buffer layer may receive the light, and reflect the light and redirect the light toward the optical element.

Figure 2D:
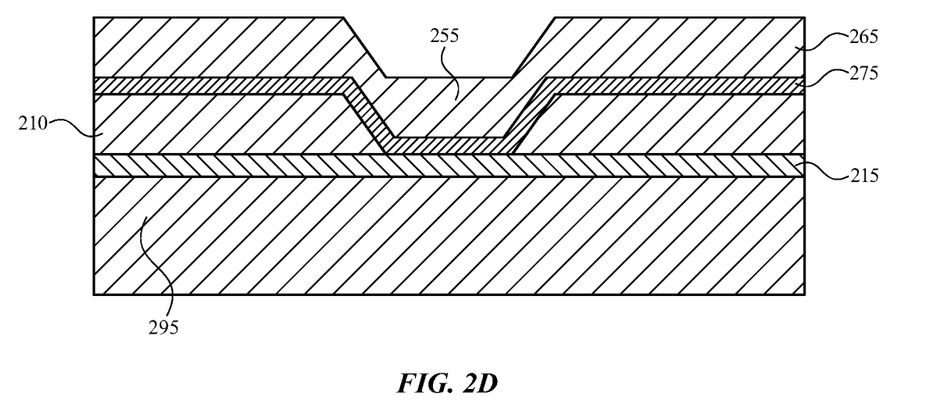
FIG. 2D illustrates a side view of a photonics device during processing.

In FIG. 2D, a fill material 265 may be deposited in the cavity 255. The fill material may be poly-silicon and may be greater than three microns thick. Generally, the fill material may be deposited in a thickness that is at least as deep as the measurement from the bottom of the cavity to the surface of the off-cut substrate. The fill material may be at least the depth of the cavity so that the fill material and the off-cut substrate may be planarized in subsequent operations as described herein and with reference to FIG. 2E. In some examples, the fill material may fill the entirety of the cavity so that the entire length of the cavity sidewalls may be supported after inverting the off-cut substrate as described herein. Although the cavity 255 may be filled with a fill material, for discussion purposes, the cavity 255 may be referred to as such, with or without the fill material inside of it. The terms "reinforcement material" and "fill material" may be used interchangeably herein.

In some examples, the fill material may be an oxide fill layer, where the buffer layer 275 may be a nitride stop layer with subsequent bond flow. The fill material 265 may provide structural integrity to the cavity 255 once the structure is inverted and bonded to a third substrate as described with reference to FIGS. 1-4 and as described herein. Because the fill material 265 provides structural reinforcement to the cavity 255, the fill material 265 may be a reinforcement material. As used herein, the terms "fill material" and "reinforcement material" may be used interchangeably herein.

Figure 2E:
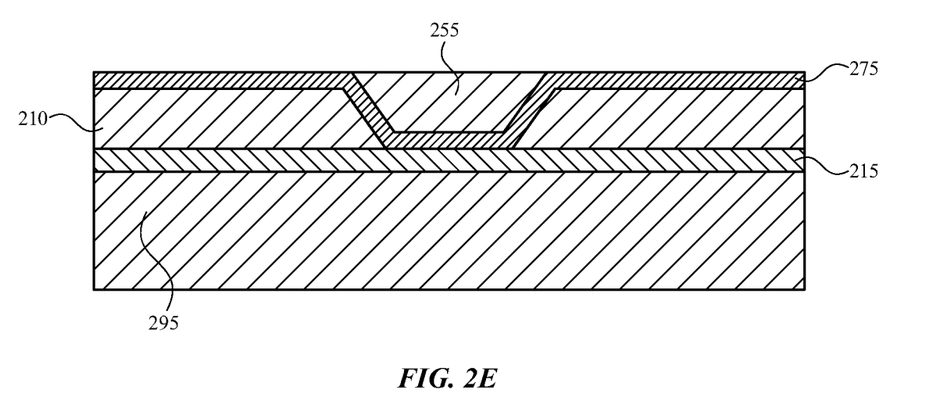
FIG. 2E illustrates a side view of a photonics device during processing.

As illustrated in FIG. 2E, the poly-silicon fill material 265 may be polished back to the original surface of the off-cut substrate 210 using chemical mechanical polishing where the buffer layer 275 may be silicon dioxide and may function as a stop layer for the polish. In the example that the fill material 265 is an oxide fill layer, the buffer layer 275 may be a nitride stop layer. The polishing may remove the fill material 265 so that it may create an approximately planar surface with the buffer layer 275 so that the fill material 265 and the buffer layer 275 may be co-planar. The fill material 265 may effectively "fill-up" the cavity 255 to provide a supported outcoupler as described herein.

Figure 2F:
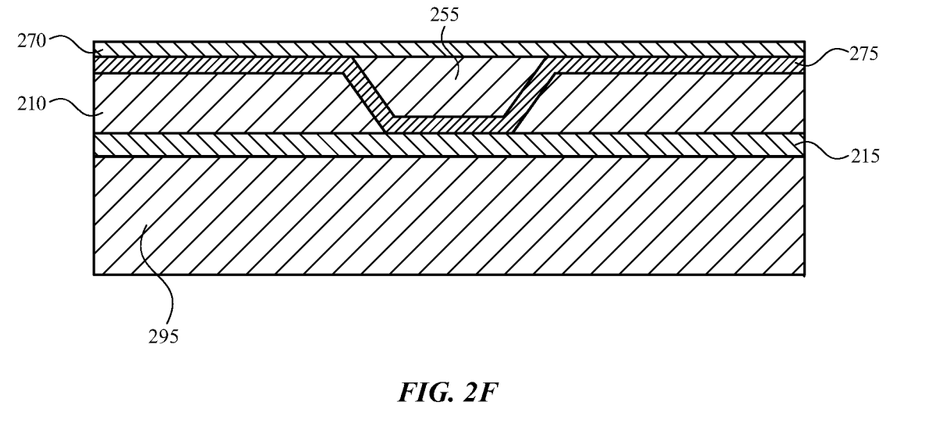
FIG. 2F illustrates a side view of a photonics device during processing.

In FIG. 2F, a first cladding layer 270 may be deposited over the cavity 255 and the buffer layer 275. The first cladding layer 270 may be adjacent to the fill material 265 and the buffer layer 275. In some examples, the first cladding layer 270 may abut the fill material 265 and the buffer layer 275. The first cladding layer 270 may be silicon dioxide or any other appropriate material, such as an oxide material, which may fill any voids that may be incidentally formed due to dishing when the fill material is polished down to the surface of the buffer layer 275. The first cladding layer 270 may be polished via chemical mechanical polishing to the final target thickness of the first cladding layer 270, which may be the bottom cladding layer of the waveguide structure in the photonics device. The chemical mechanical polishing of the first cladding layer 270 may serve to planarize the first cladding layer 270 for subsequent bonding operations.

Figure 2G:
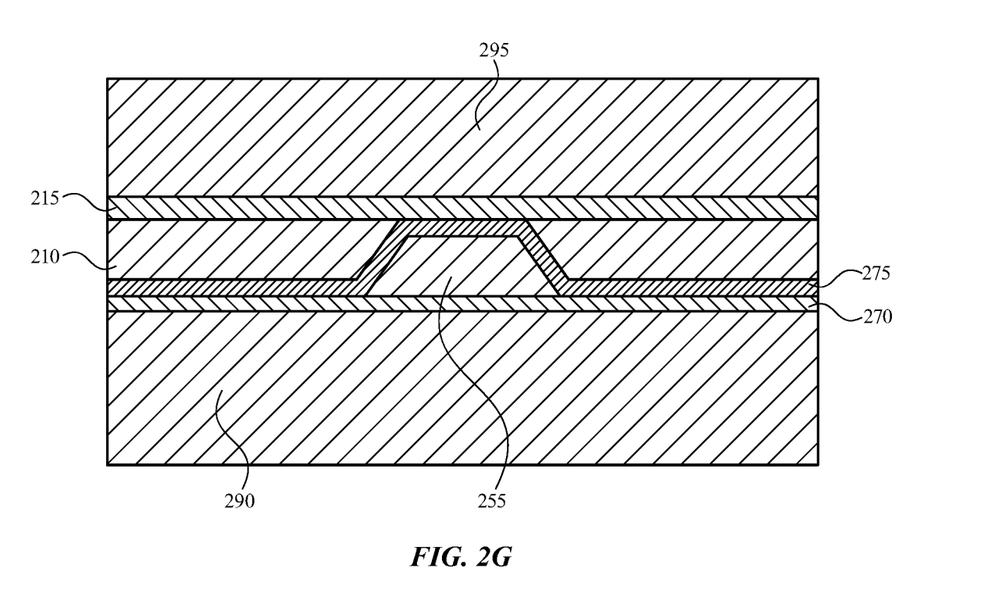
FIG. 2G illustrates a side view of a photonics device during processing.

In FIG. 2G, the off-cut substrate 210 may be bonded to a substrate 290 via bonding the first cladding layer 270 to the substrate 290. The off-cut substrate 210 may be turned upside down or flipped over and bonded to the substrate 290 so that the sacrificial substrate 295 now may be effectively the top layer in the photonics device stack. The substrate 290 may be a silicon wafer and the off-cut substrate 210 may be bonded to the substrate 290 using direct wafer bonding. As shown in FIG. 2G, the first cladding layer 270 may be adjacent to the substrate 290 and in some examples, the first cladding layer 270 may abut the substrate 290.

Figure 2H:
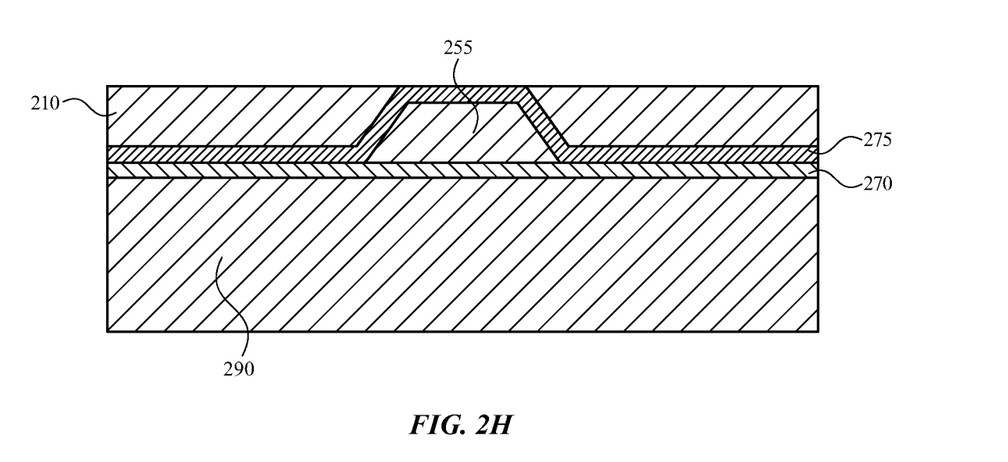
FIG. 2H illustrates a side view of a photonics device during processing.

In FIG. 2H, the sacrificial substrate 295 may be removed by any appropriate method, such as grinding, polishing, etching, any combination thereof, and so forth. The sacrificial substrate 295 along with layer 215 may be removed, leaving the approximately three micron off-cut substrate 210 bonded to the silicon substrate 290 with the cavity 255 with the <111> crystal plane inverted. The inverted cavity 255 may function as an outcoupler as described with reference to FIG. 1. Because the cavity 255 is now inverted and the fill material 265 is below the buffer layer 275, the fill material 265 may provide structural integrity to the cavity 255, which may allow for increased yield when integrating the photonics device with the supported outcoupler into other optical and/or electrical systems. The top surface of the photonics device may now be the surface of the off-cut substrate 210 and part of the buffer layer 275.

Figure 2I:
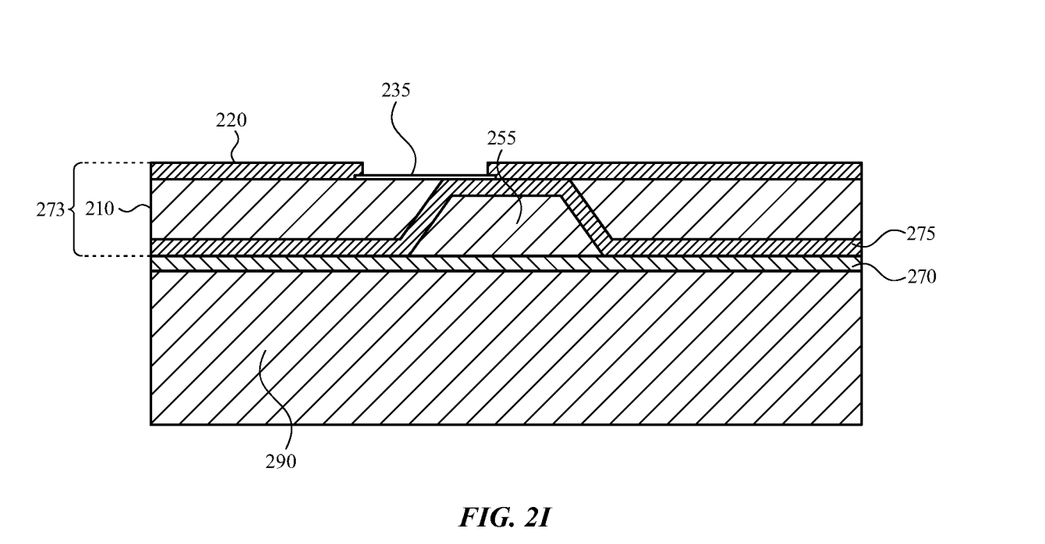
FIG. 2I illustrates a side view of a photonics device during processing.

In FIG. 2I, the second cladding layer 220 may be deposited onto the waveguide structure 273 and may be silicon dioxide or any other appropriate material, such as an oxide material. The second cladding layer 220 of the waveguide structure 273 may be etched over the area of the outcoupler and an anti-reflection layer 235 may be deposited. The anti-reflection layer 235 may allow light that is redirected by the outcoupler to effectively pass through the second cladding layer 220 toward the optical element as described with reference to FIG. 1. Additional fabrication operations may be performed on the photonics device including, but not limited to, integrating heaters, forming waveguide structures, depositing layers such as an anti-reflection coating, any combination thereof, and so forth.

Figure 3:
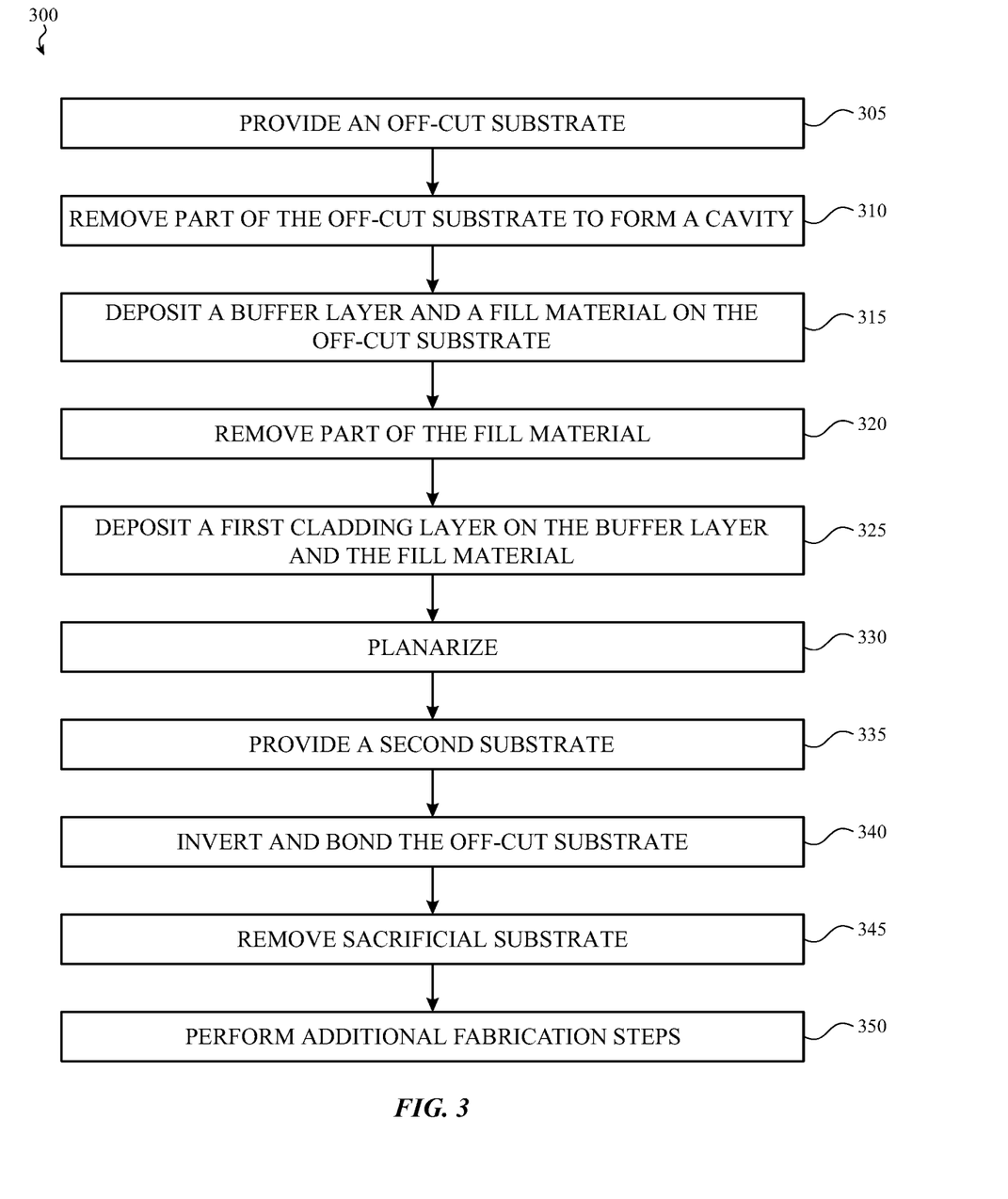
FIG. 3 illustrates a process flow for fabricating a photonics device.

FIG. 3 illustrates a process flow for fabricating a photonics device. The process 300 may start with providing an off-cut substrate at operation 305. As previously described, the off-cut substrate may be a silicon-on-insulator wafer and may be offset at approximately 9.7 degrees from the <100> crystalline plane. In some examples, the off-cut substrate may be offset approximately 9.7 degrees from a <100> crystal orientation to achieve the preferential etching along the <111> crystalline plane. The off-cut substrate may be offset from the <100> crystal orientation depending on which crystal orientation or plane along which the cavity is etched. For example, if the sidewalls of the cavity were selectively etched along a <010> crystal plane instead of the <111> crystal plane, the offset of the off-cut substrate relative to the <100> crystal orientation would be different. At operation 310 part of the off-cut substrate may be removed to form a cavity with sidewalls that angle at approximately 45 degrees with respect to the surface of the off-cut substrate. The off-cut substrate may be mounted on a sacrificial substrate that may serve as a "handle" for the off-cut substrate as described herein.

At operation 315, a buffer layer may be deposited on the off-cut substrate and inside of the cavity to provide a conformal coating on the off-cut substrate and the bottom and sidewalls of the cavity. The buffer material may be silicon dioxide and may have reflective properties that may allow light to be reflected and redirected, which may depend at least in part on the angle of the sidewalls of the cavity. A fill material, which may be poly-silicon, also may be deposited on top the buffer layer and may coat the buffer layer. In some examples, the fill material may be greater than three microns thick. The fill material later may be deposited using high density plasma for gap fill application with a high aspect ratio, which may provide a dense oxide material. In some examples, low pressure chemical vapor deposition (LPCVD) oxide may be used. In still further examples, the oxide may be tetraethoxysilane (TEOS) or silane based for plasma enhanced chemical vapor deposition (PECVD) or LPCVD may be employed with the appropriate anneal conditions before performing the direct wafer bonding and/or chemical mechanical polishing performed in subsequent operations discussed herein. These deposition techniques may be used to deposit the fill material as well as the first cladding layer as described with reference to operation 325 and FIG. 2F. The fill material may be at least this thick because the off-cut substrate may be approximately three microns thick. Accordingly, the fill material may be at least the thickness of the off-cut substrate regardless of the off-cut substrate thickness. At operation 320, the fill material may be polished down to the surface of the buffer material so that the fill material along with the buffer layer may be approximately planar.

At operation 325, the first cladding layer may be deposited on the buffer material layer and the fill material and, at operation 330, the first cladding layer may be planarized. The first cladding layer may also serve to fill in any voids that may result when polishing the fill material down at operation 320. Although planes and different layers being planarized are discussed herein, this may be understood that the layers and surface are approximately planarized and may not be completely level.

At operation 335, a second substrate may be provided and may be a silicon substrate. At operation 340, the off-cut substrate may be inverted and bonded to the second substrate. The cavity may be inverted and the fill material may provide structural integrity functionality. The structural integrity provided by the fill material may allow for increased yield in subsequent processing operations and integrating operations of the waveguide into other devices and systems. The sacrificial substrate may be used as a handle to invert the off-cut substrate and to bond the off-cut substrate to the second substrate. In bonding the off-cut substrate to the second substrate, the first cladding layer may be bonded to and abut the second substrate. In some examples, the first cladding layer may be adjacent to the second substrate. The off-cut substrate may be bonded to the second substrate using direct wafer bonding.

At operation 345, the sacrificial substrate may be removed by chemical mechanical polishing. A layer may be between the sacrificial substrate and the off-cut substrate and may serve as a stop layer when etching the cavity into the off-cut substrate. At operation 350, additional fabrication steps may be performed such as depositing a second cladding layer, etching an area of the second cladding layer over at least the outcoupler, and depositing an anti-reflective material so that light may exit the waveguide structure. Other fabrication or processing operations such as, but not limited to, deposition, etching, metallization, annealing, photolithography, stripping, plating, any combination thereof, and so forth may be performed as appropriate.

Figure 4:
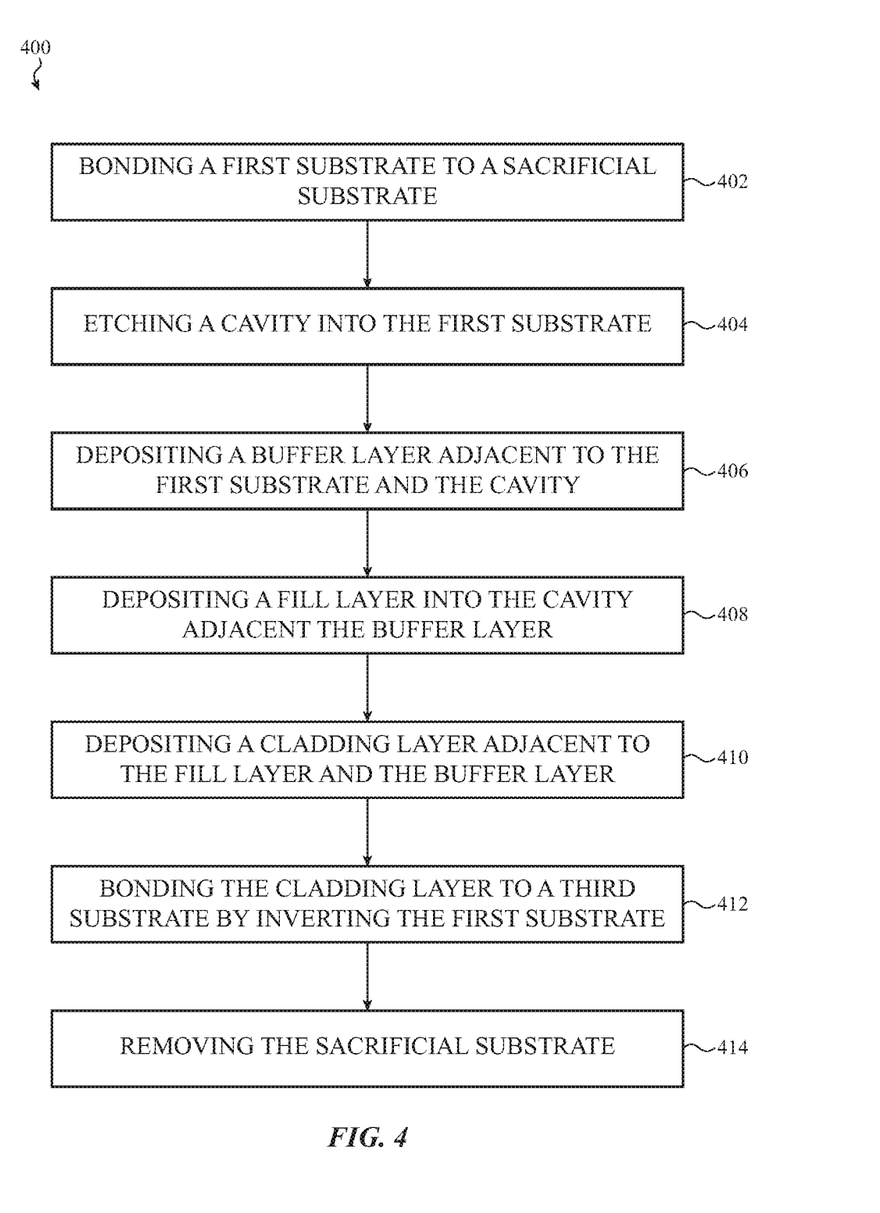
FIG. 4 illustrates a process flow for fabricating a photonics device.

FIG. 4 illustrates a process flow for fabricating a photonics device. The process 400 may start with bonding a first substrate to a sacrificial substrate at operation 405. The sacrificial substrate may be referred to as such because it is removed in later processing operations as described herein. In some examples, the sacrificial substrate may be referred to as a "handle" as the sacrificial substrate may be used to invert the first substrate structure when bonding the first substrate to another substrate, and then the sacrificial substrate may be removed from the first substrate. In some examples, the first substrate may be bonded to the sacrificial substrate using direct wafer bonding or any other appropriate technique to join the two wafers together. In some examples, the first substrate may be a silicon on insulator wafer.

At operation 410, the fabrication process or process flow may include etching a cavity into the first substrate. After etching, the first substrate may have a first sidewall extending from the planar surface of the first substrate at a first angle and a second sidewall extending from the planar surface of the first substrate at a second angle, where the first angle and the second angle may be the same. The first and second angles of the first and second sidewalls, respectively, may be determined by the preferential etch and the first and second angles may be oriented at a <111> crystal orientation.

At operation 415, the process flow may include depositing a buffer layer adjacent to the first substrate and the cavity. The buffer layer may be a material that is deposited over and directly in contact with the first substrate and the cavity. The buffer layer may coat the sidewalls of the cavity to form the outcoupler. In this way, the buffer layer may be part of the outcoupler and the buffer layer may be a reflective material.

At operation 420, the process flow may include depositing a fill layer into the cavity adjacent the buffer layer. In some examples, the fill layer thickness may be equal to or greater than the depth of the cavity and the fill layer may be adjacent to or directly touching the buffer layer. In some examples, the cavity may be approximately three microns deep and the fill layer thickness may be around three microns thick or greater than three microns thick. The fill layer may serve as the support for the outcoupler after the first wafer structure is inverted and bonded to a third substrate, thus the process flow may provide for a supported outcoupler. The fill layer may be polished down to the buffer layer so that the fill layer and the buffer layer may be co-planar with one another. This may be achieved using chemical mechanical polishing or any other appropriate technique for removing material.

At operation 425, the process flow may include depositing a cladding layer adjacent to the fill layer and the buffer layer. In some examples, the cladding layer may be directly touching or abutting the fill layer and the buffer layer. The cladding layers on either side of the first substrate may serve as reflective surfaces so that the light propagating through the first substrate may confine light to the propagation material by reflecting light incident on the cladding layer(s). In some examples, another cladding layer may be depositing after removing the sacrificial substrate as discussed herein.

At operation 430, the process flow may include bonding the cladding layer to a third substrate by inverting the first substrate. The sacrificial substrate may serve as a handle for the first substrate when bonding the cladding layer to the third substrate. At operation 435, the process flow may include removing the sacrificial substrate. The sacrificial substrate may be removed using chemical mechanical polishing or any other appropriate fabrication process for removing material. After the sacrificial substrate is removed, another cladding layer may be deposited and may receive and reflect light back into the first substrate.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A photonics device, comprising:
   a first substrate;
   a second, off-cut substrate located above the first substrate and defining a cavity;
   a buffer material coating the second, off-cut substrate and the cavity;
   a fill material located inside the cavity; and
   a cladding layer between the first substrate and the second off-cut substrate and adjacent to the fill material and the buffer material, wherein:
   the cladding layer is positioned between the fill material and the first substrate;
   the buffer material is configured to receive light; and
   the buffer material redirects light toward a surface of the photonics device.

2. The photonics device of claim 1, wherein:
   the second, off-cut substrate comprises:
     a planar surface;
     a first sidewall extending from the planar surface at a first angle;
     a second sidewall extending from the planar surface at a second angle; and
     a base connected to the first and second sidewalls, wherein:
       the first angle of the first sidewall is oriented at a <111> crystal orientation; and
       the second angle of the second sidewall is oriented at a <111> crystal orientation;
       the buffer material is part of an outcoupler;
       the fill material and the buffer material form a plane; and
       the fill material provides structural integrity to the cavity.

3. The photonics device of claim 1, wherein:
   the second, off-cut substrate comprises:
     a planar surface;
     a first sidewall extending from the planar surface at a first angle;
     a second sidewall extending from the planar surface at a second angle; and
     a base connected to the first and second sidewalls, wherein:
       the first angle of the first sidewall is oriented at a <111> crystal orientation; and
       the second angle of the second sidewall is oriented at a <111> crystal orientation.

4. The photonics device of claim 1, wherein:
   the buffer material is an outcoupler; and
   the photonics device further comprises an anti-reflection layer that is adjacent to the second off-cut substrate and above the outcoupler.

5. The photonics device of claim 1, wherein:
   the first substrate is silicon; and
   the second off-cut substrate is an off-cut silicon-on-insulator substrate.

6. The photonics device of claim 1, wherein the second off-cut substrate is offset from a <100> crystal orientation by 9.7 degrees.

7. The photonics device of claim 1, wherein:
   the buffer material is a continuous layer having:
     a first portion abutting between the first substrate and the second off-cut substrate and adjacent to the fill material and the buffer material;
     a second portion operative to reflect light; and
     a third portion abutting a second cladding layer and an anti-reflective coating;
   the buffer material is silicon dioxide.

8. The photonics device of claim 1, wherein the second, off-cut substrate comprises:
   a planar surface;
   a first sidewall extending from the planar surface at a first angle;
   a second sidewall extending from the planar surface at a second angle; and
   the first and the second angle are the same.

9. The photonics device of claim 1, wherein the fill material is poly-silicon.

10. A waveguide structure, comprising:
    a substrate;
    a first cladding layer configured to reflect light;
    a buffer layer adjacent to the first cladding layer and configured to reflect light out of the waveguide structure;
    a reinforcement material disposed under the buffer layer, wherein the reinforcement material is configured to provide structural reinforcement to the buffer layer;
    an offset silicon layer configured to allow light to propagate through the offset silicon layer; and
    a second cladding layer adjacent to the offset silicon layer and configured to reflect light,
    wherein the first cladding layer is positioned between the reinforcement material and the substrate.

11. The waveguide structure of claim 10, wherein:
    the buffer layer is an outcoupler;
    the waveguide structure further comprises an anti-reflective layer positioned above the outcoupler;
    the outcoupler comprises:
      a first side extending at a first angle from the offset silicon layer;
      a second side opposite the first side and extending at a second angle from the offset silicon layer; and
      the first angle and the second angle are determined by the crystal orientation of the offset silicon layer; and
    the offset silicon layer is a core of the waveguide structure.

12. The waveguide structure of claim 10, wherein the buffer layer is silicon dioxide.

13. The waveguide structure of claim 10, wherein:
    the reinforcement material is poly-silicon; and
    a surface of the poly-silicon is co-planar with the buffer layer.

14. The waveguide structure of claim 10, wherein the offset silicon layer is offset 9.7 degrees from a <100> crystalline plane.

* * * * *